US008202504B2

(12) United States Patent
Ohta et al.

(10) Patent No.: US 8,202,504 B2
(45) Date of Patent: *Jun. 19, 2012

(54) METHOD FOR MANUFACTURING CARBON NANOTUBES

(75) Inventors: Kazuchika Ohta, Nagano (JP); Ick-Soo Kim, Nagano (JP); Byoung-Suhk Kim, Nagano (JP); Jongchul Park, Seoul (KR)

(73) Assignee: Shinshu University, Nagano (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/534,268

(22) Filed: Aug. 3, 2009

(65) Prior Publication Data

US 2010/0196248 A1 Aug. 5, 2010

Related U.S. Application Data

(63) Continuation-in-part of application No. PCT/JP2009/051859, filed on Feb. 4, 2009.

(51) Int. Cl.
*D01F 9/12* (2006.01)
*B01J 19/08* (2006.01)

(52) U.S. Cl. .................... 423/447.1; 977/842; 977/844; 204/157.47

(58) Field of Classification Search .... 423/447.1–447.3, 423/445 B; 977/742–754, 842–848; 428/367; 204/157.47

See application file for complete search history.

(56) References Cited

U.S. PATENT DOCUMENTS 6,066,290 A * 5/2000 Dennis et al. ................. 419/38

2007/0020168 A1 * 1/2007 Asmussen et al. ......... 423/447.3
2007/0140947 A1   6/2007 Schneider et al.
2008/0233041 A1   9/2008 Jang et al.

FOREIGN PATENT DOCUMENTS

| JP | 6040711 A | 2/1994 |
| JP | 6080391 B | 10/1994 |
| JP | 6287010 A | 10/1994 |

(Continued)

OTHER PUBLICATIONS

Ohta, et al., Development of Facile SyntheticMethods of Carbon Nanotubes and Nanocapsules by Using a Domestic Microwave Oven, Global Congress on Microwave Energy Applications) Aug. 4-8, 2008 MAJIC 1st Proceedings, "The New Flame for Humanity,".*

(Continued)

*Primary Examiner* — Daniel C. McCracken
(74) *Attorney, Agent, or Firm* — Lowe Hauptman Ham & Berner LLP (57) ABSTRACT

A method for manufacturing carbon nanotubes of the present invention includes the steps of: preparing a metal complex which contains at least one metal selected from a group consisting of iron, cobalt and nickel and an organic compound: and forming carbon nanotubes which contain metal therein by using the organic compound as a carbon source, wherein the carbon nanotubes are formed by putting the metal complex into a heating vessel which has a substance capable of converting electromagnetic energy into heat, and by heating the metal complex using heat which is generated by the heating vessel when electromagnetic energy is applied to the heating vessel. As the metal complex used in a method for manufacturing carbon nanotubes of the present invention, nickel stearate or nickel benzoate can be named, for example. According to the method for manufacturing carbon nanotubes of the present invention, it is possible to manufacture carbon nanotubes using an inexpensive heating device within a short time.

8 Claims, 5 Drawing Sheets

FOREIGN PATENT DOCUMENTS

| | | | |
|---|---|---|---|
| JP | 2007145674 | A | 6/2007 |
| JP | 2007516923 | A | 6/2007 |
| JP | 2008044840 | A | 2/2008 |
| JP | 2008273807 | A | 11/2008 |
| JP | 2008280195 | A | 11/2008 |

OTHER PUBLICATIONS

Park, et al., Effects of iron catalyst on the formation of crystalline domain during carbonization of electrospun acrylic nanofiber, Synthetic Metals 2005; 150: 265-270.*

Ko, et al., Purification of multi-walled carbon nanotubes through microwave heating of nitric acid in a closed vessel, Carbon 2005; 43: 727-733.*

Geng, et al., Direct conversion of nickel stearate into carbon nanotubes or pure-phase metallic Ni nanoparticles encapsulated in polyhedral graphite cages, J. Mater. Chem. 2005; 15: 844-849.*

GCMEA (Global Congress on Microwave Energy Applications) Aug. 4-8, 2008 MAJIC 1st Proceedings, "The New Flame for Humanity".

Junfeng Geng et al., "Direct conversion of nickel stearate into carbon nanotubes or pure-phase metallic Ni nanoparticles encapsulated in polyhedral graphite cages," J. Matter Chem., 2005, 15, pp. 844-849.

Jin-Huan Huang et al., "Selective growth of carbon nanotubes on nickel oxide templates created by atomic force microscope nano-oxidation," Diamond & Related Materials, 14, 2005, pp. 744-748.

Chia-Chih Chuang et al., "The role of Ti interlayer in carbon nanotube growth," Surface & Coatings Technology, 202, 2008, pp. 2121-2125.

* cited by examiner

METHOD FOR MANUFACTURING CARBON NANOTUBES

RELATED APPLICATIONS

The present application is a continuation-in-part of International Application Number PCT/JP2009/051859 filed Feb. 4, 2009, the disclosure of which is hereby incorporated by reference herein in its entirety.

TECHNICAL FIELD

The present invention relates to a method for manufacturing carbon nanotubes. To be more specific, the present invention relates to a method for manufacturing carbon nanotubes within a short time using an inexpensive device such as a microwave oven for household use. Here, the term "carbon nanotubes" used in this specification, Claims and the like includes not only carbon nanotubes but also carbon nanocapsules.

BACKGROUND OF THE INVENTION

Carbon nanotubes are generally manufactured by an arc discharge method, a laser abrasion method, a chemical vapor deposition method (CVD method) or the like. Besides these methods, there has been also reported a method which manufactures carbon nanotubes made of nickel stearate using an electric furnace (see non-patent document 1).

This method can manufacture carbon nanotubes by heating nickel stearate in an electric furnace under argon atmosphere at a temperature of 800° C. to 1000° C.

Non-Patent Document: Junfeng Geng and two others, "Journal of Materials Chemistry", 2005, vol. 15, p. 844-849

DISCLOSURE OF THE INVENTION

Problems to be Solved by the Invention

According to the method described in non-patent document 1, it is possible to manufacture carbon nanotubes under mild conditions using an inexpensive device compared to an arc discharge method, a laser abrasion method or a CVD method. However, in manufacturing carbon nanotubes using an electric furnace, the increase of temperature up to the formation temperature for forming carbon nanotubes from room temperature takes an extremely long time such as several hours, and the lowering of the temperature to room temperature after forming carbon nanotubes also takes an extremely long time such as several hours. Further, there has also been a demand for the introduction of a method for manufacturing carbon nanotubes using a heating device which is less expensive than an electric furnace.

The present invention has been made under such circumstances, and it is an object of the present invention to provide a method for manufacturing carbon nanotubes within a short time using an inexpensive heating device.

Means for Solving the Problems

The inventors of the present invention have made extensive studies to achieve the above-mentioned object, and have completed the present invention based on the following finding. That is, it was found that by applying electromagnetic energy to a metal complex which contains a catalyst for forming carbon nanotubes and an organic compound in an environment where electromagnetic energy is converted into heat, it is possible to manufacture carbon nanotubes using an inexpensive heating device within an extremely short time.

The present invention has been made based on such finding.

[1] According to one aspect of the present invention, there is provided a method for manufacturing carbon nanotubes which includes the steps of: preparing a metal complex which contains at least one metal selected from a group consisting of iron, cobalt and nickel and an organic compound: and forming carbon nanotubes which contain metal therein by using the organic compound as a carbon source, wherein the carbon nanotubes are formed by putting the metal complex into a heating vessel which has a substance capable of converting electromagnetic energy into heat, and by heating the metal complex using heat which is generated by the heating vessel when electromagnetic energy is applied to the heating vessel.

According to the method for manufacturing carbon nanotubes of the present invention, it is possible to manufacture carbon nanotubes using an inexpensive heating device within a short time. Further, according to the method for manufacturing carbon nanotubes of the present invention, the organic compound contained in the metal complex is used as a carbon source and hence, no other carbon source is necessary except for the metal complex whereby the present invention also has an advantageous effect that the manufacturing steps can be simplified.

[2] In the above-mentioned method for manufacturing carbon nanotubes, the method may preferably further include a step of placing the metal complex in the heating vessel between the step of preparing metal complex and the step of forming carbon nanotubes.

[3] In the above-mentioned method for manufacturing carbon nanotubes, in the step of placing the metal complex in the heating vessel, the metal complex may preferably be placed in the heating vessel by putting the metal complex into a reaction vessel and then placing the reaction vessel in the heating vessel.

[4] In the above-mentioned method for manufacturing carbon nanotubes, the reaction vessel may preferably be a crucible and, in the step of placing the metal complex in the heating vessel, the reaction vessel into which the metal complex is put and which has a periphery thereof coated with clay may preferably be placed in the heating vessel.

[5] In the above-mentioned method for manufacturing carbon nanotubes, in the step of forming carbon nanotubes, while the heating vessel generates heat by applying the electromagnetic energy to the heating vessel, the metal complex may preferably gradually pass through the heating vessel so that the metal complex is heated.

[6] In the above-mentioned method for manufacturing carbon nanotubes, in the step of forming carbon nanotubes, a heat-resistant tube may preferably be arranged such that a predetermined longitudinal portion of the heat-resistant tube is positioned in the heating vessel and the reaction vessel which contains the metal complex is gradually moved in the heat-resistant tube in the longitudinal direction so that the metal complex gradually passes through the heating vessel.

[7] In the above-mentioned method for manufacturing carbon nanotubes, the reaction vessel may preferably be a crucible and, in the step of forming carbon nanotubes, the reaction vessel into which the metal complex is put and which has a periphery thereof coated with clay may preferably be gradually moved in the heat-resistant tube in the longitudinal direction.

[8] In the above-mentioned method for manufacturing carbon nanotubes, the metal complex may preferably be a nickel complex of an organic compound having a carbonyl group.

[9] In the above-mentioned method for manufacturing carbon nanotubes, the nickel complex of the organic compound having a carbonyl group may preferably be either one of nickel stearate and nickel benzoate.

[10] In the above-mentioned method for manufacturing carbon nanotubes, the nickel complex of the organic compound having a carbonyl group may preferably be nickel benzoate.

[11] In the above-mentioned method for manufacturing carbon nanotubes, the metal complex may preferably be discotic metal complex liquid crystal.

[12] In the above-mentioned method for manufacturing carbon nanotubes, the substance capable of converting electromagnetic energy into heat may preferably be at least one selected from a group of substances consisting of alumina, mullite, ferrite, silicon nitride and silicon carbide.

[13] In the above-mentioned method for manufacturing carbon nanotubes, the step of forming carbon nanotubes may preferably be carried out in an inert-gas atmosphere.

[14] In the above-mentioned method for manufacturing carbon nanotubes, the step of forming carbon nanotubes may preferably include a step of maintaining the inside of the heating vessel at a temperature of 600° C. to 900° C. for 5 to 20 minutes.

[15] In the above-mentioned method for manufacturing carbon nanotubes, in the step of forming carbon nanotubes, the inside of the heating vessel may preferably be heated at a temperature of 600° C. to 900° C., and the metal complex gradually passes thorough the heating vessel for 5 to 20 minutes.

BRIEF DESCRIPTION OF DRAWINGS

FIG. 2 is a schematic view for explaining a manufacturing apparatus used in a method for manufacturing carbon nanotubes according to an embodiment 2.

BEST MODE FOR CARRYING OUT THE INVENTION

A method for manufacturing carbon nanotubes of the present invention is explained hereinafter based on embodiments shown in drawings.

Embodiment 1

Figure 1:
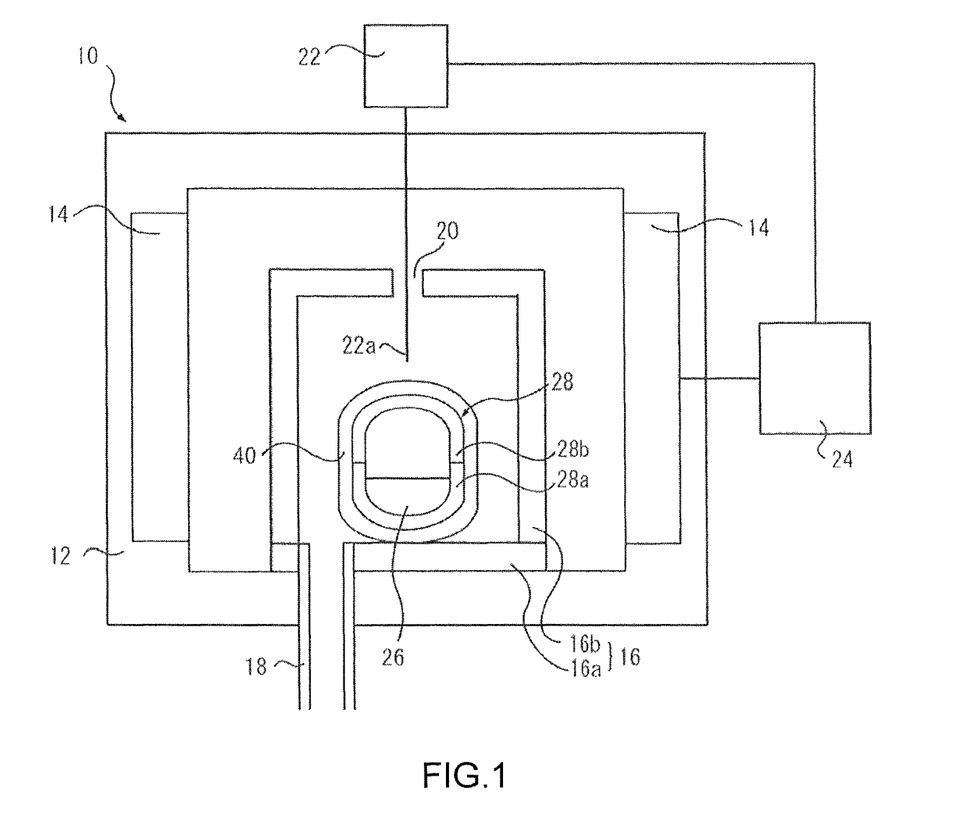
FIG. 1 is a schematic cross-sectional view of a manufacturing apparatus used in a method for manufacturing carbon nanotubes according to an embodiment 1.
Figure 2A:
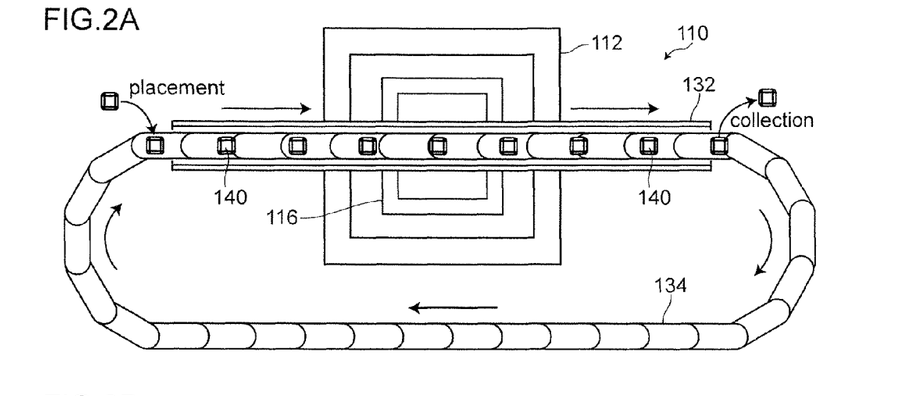
FIG. 2A is a first cross-sectional view of a manufacturing apparatus.
Figure 2B:
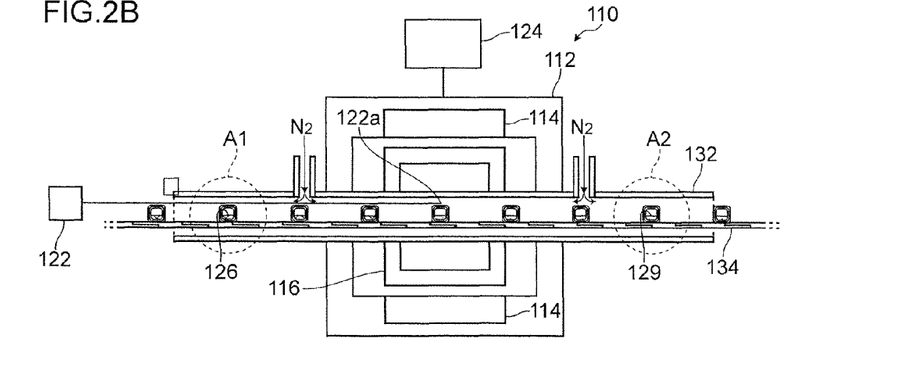
FIG. 2B is a second cross-sectional view of a manufacturing apparatus.
Figure 2C:
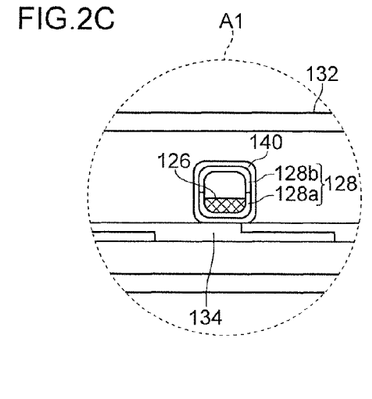
FIG. 2C is an enlarged view of a portion of FIG. 2B.
Figure 2D:
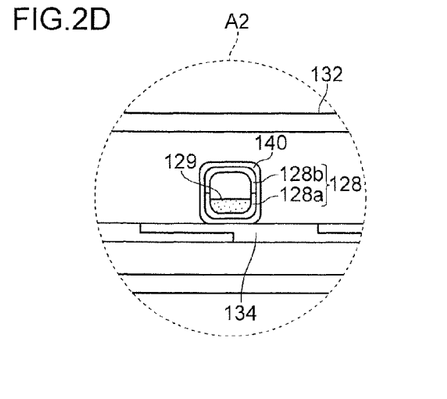
FIG. 2D is an enlarged portion of FIG. 2B.

FIG. 1 is a schematic cross-sectional view of a manufacturing apparatus 10 used in a method for manufacturing carbon nanotubes according to an embodiment 1. The manufacturing apparatus 10 includes, as shown in FIG. 1, an outer vessel 12, an electromagnetic source 14, a heating vessel 16, a gas introducing pipe 18, a gas discharge port 20, a thermocouple 22, and a control unit 24.

The electromagnetic source 14 is a device which generates electromagnetic energy and is comprising a magentron and a wave-guide (not shown in the drawing). The manufacturing apparatus 10 shown in FIG. 1 is equipped with two units of electromagnetic sources on both sides of the outer vessel 12 so that the intensity of the microwave energy within the outer vessel 12 becomes homogeneous. In a simplified configuration, the electromagnetic source can be just one, instead of two. In such configuration, the electromagnetic source 14 can be mounted on the upper wall of the outer vessel 12, like a microwave oven for household use.

In manufacturing carbon nanotubes, a crucible 28 into which a material 26 of carbon nanotubes is put is placed in the heating vessel 16. A periphery of the crucible 28 is coated with clay 40.

The outer vessel 12 has a function of confining electromagnetic energy applied from the electromagnetic source 14 in the inside thereof. The electromagnetic source 14 applies electromagnetic energy corresponding to intensity and an energy applying time of electromagnetic energy controlled by the control unit 24. A microwave oven for household use includes the outer vessel 12, the electromagnetic source 14 and the control unit 24. Accordingly, in the method for manufacturing carbon nanotubes of the embodiment 1, it is possible to use such a microwave oven for household use. By using the microwave oven for household use, the manufacturing apparatus for manufacturing carbon nanotubes becomes inexpensive. Although the kind of electromagnetic energy applied from the electromagnetic source 14 is not particularly limited, it is preferable to use microwaves for increasing the speed of temperature increase, that is, the speed at which carbon nanotubes are formed.

The heating vessel 16 is a device to heat objects therein by converting electromagnetic energy to heat. The heating vessel 16 has an approximately hollow columnar shape, and is formed of two parts consisting of a bottom portion 16a and a vessel body 16b having a top plate. An inner surface of a side wall of the vessel body 16b is coated with a substance which converts electromagnetic energy into heat (not shown in the drawing). As the substance which converts electromagnetic energy into heat, alumina, mullite, ferrite, silicon nitride, silicon carbide and the like can be named. In place of covering an inner surface of the heating vessel 16 with a substance which converts electromagnetic energy into heat, the heating vessel 16 per se may be formed using a substance which converts electromagnetic energy into heat, or a substance which converts electromagnetic energy into heat may be dispersed or impregnated into a wall of the heating vessel 16.

The gas introducing pipe 18 penetrates a bottom plate of the outer vessel 12 and the bottom portion 16a of the heating vessel 16, and a gas in the heating vessel 16 is replaced with an inert gas, for example, a noble gas such as helium or argon or a nitrogen gas. The gas discharge port 20 is formed in a center portion of the top plate of the vessel body 16b of the heating vessel 16. The gas discharge port 20 is provided for discharging the inert gas introduced into the heating vessel 16 from the gas introducing pipe 18. Further, the gas discharge port 20 also functions as an insertion hole through which a tip 22a of the thermocouple 22 is installed in the inside of the heating vessel 16.

The control unit 24 controls the intensity and the energy applying time of electromagnetic energy applied from the electromagnetic source 14. In the method for manufacturing carbon nanotubes according to the embodiment 1, based on information relating to the temperature in the heating vessel 16 measured by the thermocouple 22, the control unit 24 performs a control such that the temperature at which carbon nanotubes are formed, for example, a predetermined temperature of 600° C. to 900° C., is maintained for a predetermined time, for example, for 5 to 20 minutes.

The material 26 of carbon nanotubes is put into the crucible 28, and the crucible 28 is placed in the heating vessel 16. The material 26 is a metal complex which contains at least one metal selected from a group consisting of iron, cobalt and nickel and an organic compound. Iron, cobalt or nickel functions as a catalyst for forming carbon nanotubes, and the organic compound functions as a carbon source for forming carbon nanotubes. The metal complex may be a metal complex of aliphatic carboxylic acid, a metal complex of aromatic carboxylic acid or a metal complex of aromatic carboxylic acid having long-chain alkyl group. As the metal complex of aliphatic carboxylic acid, iron stearate, cobalt stearate, nickel stearate, lauric acid iron, lauric acid cobalt, lauric acid nickel or the like can be named. As the metal complex of aromatic carboxylic acid, iron benzoate, cobalt benzoate or nickel benzoate can be named. As the metal complex of aromatic carboxylic acid having long-chain alkyl group, dodecyl oxybenzoic acid iron, dodecyl oxybenzoic acid cobalt, dodecyl oxybenzoic acid nickel or the like can be named.

It is preferable to use the nickel complex of organic compound having a carbonyl group as the metal complex for the following reason. That is, when the nickel complex of organic compound having a carbonyl group is heated at a high temperature in an inert gas atmosphere, oxygen in the carbonyl group is bonded to carbon thus forming carbon dioxide, and carbon dioxide escapes from the carbonyl group and hence, nickel easily turns into pure metal nanoparticles. Nickel metal which turns into nanoparticles can acquire an extremely large surface area thus remarkably increasing a catalytic function for forming carbon nano tubes.

As the nickel complex of the organic compound having a carbonyl group, a nickel complex of aliphatic carboxylic acid or a nickel complex of aromatic carboxylic acid can be named. As the nickel complex of aliphatic carboxylic acid or the nickel complex of aromatic carboxylic acid, for example, nickel stearate or nickel benzoate can be named. Among these nickel complexes, as described later, it is preferable to use nickel benzoate from a viewpoint of purity of formed carbon nanotubes.

Further, the metal complex may be discotic metal complex liquid crystal containing iron, cobalt or nickel in molecules thereof. Discotic metal complex liquid crystal contains a long-chain alkyl group, wherein the long-chain alkyl group is used as a carbon source for forming carbon nanotubes, and metal functions as a catalyst for forming carbon nanotubes. Accordingly, most kinds of discotic metal complex liquid crystals containing iron, cobalt or nickel in molecules thereof can be adopted as a material usable in the method for manufacturing carbon nanotubes of the present invention. That is, discotic metal complex liquid crystal has the internal structure where disc-shaped molecules each of which contains at least one metal selected from a group consisting of iron, cobalt and nickel which is arranged at the center and an organic compound arranged around the metal are stacked Using such discotic metal complex liquid crystal as the material 26 for forming carbon nanotubes, it is possible to form carbon nanotubes which contain metal particles having magnetism therein. Nickel complex which constitutes such discotic metal complex liquid crystal can be manufactured by a method described in JP-A-6-263782, for example.

The crucible 28 is made of alumina, and is constituted of two approximately-bowl-shaped members consisting of a lower member 28a into which the material 26 is put and an upper member 28b which functions as a lid. Provided that the crucible 28 is formed by using a heat resistant material having a heat resistant temperature of 900° C. or more, the material of the crucible 28 is not limited to alumina. Further, to reduce the temperature difference between the outside and the inside of the crucible 28 during the formation of carbon nanotubes, it is preferable to use the crucible 28 made of a material having high heat conductivity. Further, the periphery of the crucible 28 is coated with clay 40 for preventing the oxidization of the material 26 and for binding the lower member 28a and the upper member 28b together For example, stone dust clay may be used as clay 40. The clay 40 may be eliminated if the lower member 28a and the upper member 28b mate each other tightly by themselves.

The method for manufacturing carbon nanotubes according to this embodiment is carried out in accordance with the following steps. First of all, the material 26 is put into the lower member 28a of the crucible 28. The material 26 is sealed in the crucible 28 by aligning an opening end of the upper member 28b and an opening end of the lower member 28a. Next, the periphery of the crucible 28 is coated with clay 40 and, thereafter, the crucible 28 is subject to dry treatment at a temperature of approximately 120° C. for evaporating moisture in clay. Then, the crucible 28 coated with clay 40 is placed on the bottom portion 16a of the heating vessel 16 which is fixed to the outer vessel 12. Here, a mounting base which conforms to a shape of the crucible 28 may be placed on the bottom portion 16a, and the crucible 28 may be placed on the mounting base.

Next, the vessel body 16b is placed on the bottom portion 16a so that the crucible 28 is placed in the inside of the heating vessel 16, that is, the material 26 is put into the heating vessel 16. Thereafter, the tip 22a of the thermocouple 22 is brought into an area close to the crucible 28 in a state where the tip 22a of the thermocouple 22 passes through the top plate of the outer vessel 12 and the gas discharge port 20 formed in the heating vessel 16 from the outside of the manufacturing apparatus 10. Then, an inert gas is introduced into the heating vessel 16 through the gas introducing pipe 18. When a gas in the heating vessel 16 is sufficiently replaced with the inert gas, the control unit 24 performs a control so as to allow the electromagnetic source 14 to apply electromagnetic energy. The electromagnetic energy applied from the electromagnetic source 14 is applied to the heating vessel 16 so that the electromagnetic energy is converted into heat. A temperature in the heating vessel is rapidly elevated due to this heat, and the temperature in the heating vessel arrives at a carbon nanotubes forming temperature of 600° C. to 900° C.

Then, using the control unit 24, a temperature in the inside of the heating vessel is maintained at a carbon nanotubes forming temperature of 600° C. to 900° C. for several minutes thus forming carbon nanotubes. Thereafter, the application of electromagnetic energy from the electromagnetic source 14 is stopped. When several minutes elapse after the application of electromagnetic energy is stopped, the inside of heating vessel 16 is cooled down to a room temperature. The introduction of the inert gas into the heating vessel 16 is continued until the temperature in the heating vessel 16 is lowered to the room temperature, for example.

Next, the thermocouple 22 is pulled out from the gas discharge port 20, the vessel body 16b of the heating vessel 16 is lifted up, and the crucible 28 is removed from the outer vessel 12. Thus, carbon nanotubes are formed.

As described above, by putting a material into the heating vessel which has a substance capable of converting electromagnetic energy into heat, and by applying electromagnetic energy to the heating vessel so as to elevate the temperature in the heating vessel, the carbon nanotubes can be manufactured within a short time.

Next, clay 40 around the crucible 28 taken out from the outer vessel 12 is removed by a cutter knife and, thereafter, the upper member 28b is separated from the lower member 28a so as to open the crucible 28. A black material is adhered to an inner wall surface of the lower member 28a. This adhering material is coarse carbon nanotubes. By cleaning the coarse carbon nanotubes with acid, water and the like, and by drying the coarse carbon nanotubes, refined carbon nanotubes are obtained.

Embodiment 2

FIG. 2 is a view for explaining a manufacturing apparatus 110 used in a method for manufacturing carbon nanotubes according to the embodiment 2. FIG. 2A is a cross-sectional view of the manufacturing apparatus 110 as viewed from above, FIG. 2B is a cross-sectional view of the manufacturing apparatus 110 as viewed from a front side, FIG. 2C is an enlarged view of a portion in FIG. 2B indicated by symbol A1, and FIG. 2D is an enlarged view of a portion in FIG. 2B indicated by symbol A2. FIG. 2 shows the interior of the manufacturing apparatus 110 which is manufacturing carbon nanotubes.

The manufacturing apparatus 110 includes, as shown in FIG. 2, an outer vessel 112, an electromagnetic source 114, a heating vessel 116, a thermocouple 122, a control unit 124 and a quartz glass tube 132 which constitutes a heat-resistant tube. The quartz glass tube 132 is mounted such that a predetermined longitudinal portion of the quartz glass tube 132 is positioned in the heating vessel 116.

The electromagnetic source 114 is a device which generates electromagnetic energy and is comprising a magentron and a wave-guide (not shown in the drawing). The manufacturing apparatus 110 shown in FIG. 2 is equipped with two units of electromagnetic sources on both sides of the outer vessel 112 so that the intensity of the microwave energy within the outer vessel 112 becomes homogeneous. In a simplified configuration, however, the electromagnetic source can be just one, instead of two. In such configuration, the electromagnetic source 14 can be mounted on the upper wall of the outer vessel 112, like a microwave oven for household use.

In manufacturing carbon nanotubes, first of all, a metal complex 126 which contains at least one metal selected from a group consisting of iron, cobalt and nickel and an organic compound (a material for manufacturing carbon nanotubes) is prepared. Thereafter, in a state where the heating vessel 116 generates heat due to the application of electromagnetic energy to the heating vessel 116, a crucible 128 which constitutes a reaction vessel and into which a metal complex 126 is put is gradually moved in the quartz glass tube 132 in the longitudinal direction. As a result, the metal complex 126 gradually passes through the heating vessel 116 so that the metal complex 126 is efficiently heated. Here, the crucible 128 is moved by placing the crucible 128 on a quartz glass-made conveyer 134 which gradually advances in the direction indicated by an arrow by a drive means not shown in the drawing.

A quartz glass-made conveyer 134 can also be made of other materials than quartz glass such as ceramics so long as the material withstands a high temperature.

The outer vessel 112 has a function of confining electromagnetic energy applied from an electromagnetic source 114 in the inside thereof. The electromagnetic source 114 applies electromagnetic energy corresponding to intensity and an energy applying time of electromagnetic energy controlled by the control unit 124. Although a kind of electromagnetic energy applied from the electromagnetic source 114 is not particularly limited, it is preferable to use microwaves for increasing a temperature elevation speed, that is, a carbon-nanotubes forming speed.

The heating vessel 116 is a device to heat objects therein by converting electro-magnetic energy to heat. The heating vessel 116 has an approximately hollow columnar shape, wherein a hole is formed on both side surfaces, and an inner surface of a wall made of a heat insulating material is coated with a substance which converts electromagnetic energy into heat (not shown in the drawing). As such a substance which converts electromagnetic energy into heat, alumina, mullite, ferrite, silicon nitride, silicon carbide and the like can be named. In place of covering an inner surface of the heating vessel 116 with a substance which converts electromagnetic energy into heat, the heating vessel 116 per se may be formed using a substance which converts electromagnetic energy into heat, or a substance which converts electromagnetic energy into heat may be dispersed or impregnated into a wall of the heating vessel 116.

The control unit 124 controls intensity and an energy applying time of electromagnetic energy applied from the electromagnetic source 114. In the method for manufacturing carbon nanotubes according to the embodiment 2, based on information relating to a temperature in the heating vessel 116 measured by the thermocouple 122, the control unit 124 performs a control such that a temperature in the heating vessel 116 is maintained at a temperature at which carbon nanotubes are formed, for example, a predetermined temperature of 600° C. to 900° C. for 5 to 20 minutes.

The metal complex 126 which contains at least one metal selected from a group consisting of iron, cobalt and nickel and an organic compound is put into a crucible 128, and the crucible 128 is placed on a quartz glass-made conveyer 134 which gradually advances in the direction indicated by an arrow in FIG. 2. The organic compound functions as a carbon source for forming carbon nanotubes, and at least one metal selected from a group consisting of iron, cobalt and nickel functions as a catalyst for forming carbon nanotubes.

The structures, materials and manufacturing methods of the metal complex 126, the organic compound and metal nanoparticles are equal to the corresponding structures, materials and manufacturing methods exemplified in the embodiment 1, for example.

The quartz glass tube 132 can withstand an atmosphere under a temperature at the time of forming carbon nanotubes. The quartz glass tube 132 includes an inert gas introducing pipe. At the time of forming carbon nanotubes and before and after the formation of carbon nanotubes, an inert gas, for example, a noble gas such as helium or argon or a nitrogen gas is introduced into the quartz glass tube 132 so that a gas in the quartz glass tube 132 is replaced with the inert gas. The gas in the quartz glass tube 132 is replaced with the introduced inert gas for forming carbon nanotubes while preventing an oxidation reaction.

The method for manufacturing carbon nanotubes according to the embodiment 2 is carried out in accordance with following steps. First of all, an inert gas is introduced into the inert gas introducing pipe, and a gas in the quartz glass tube 132 is sufficiently replaced with the inert gas. Then, electromagnetic energy is applied to the heating vessel 116 so as to allow the heating vessel 116 to generate heat whereby a predetermined region in the inside of the quartz glass tube 132 is elevated to a desired predetermined temperature of 600° C. to 900° C., for example. Here, a tip 122a of the thermocouple 122 is placed in the predetermined region of the quartz glass tube 132, and an output of the control unit 124 is controlled based on information relating to a temperature detected by the thermocouple 122. Thereafter, in a state where such a temperature is maintained, the crucible 128 into which the metal complex 126 is put is placed on the quartz glass-made conveyer 134 which gradually advances in the direction indicated by an arrow in FIG. 2.

As a result, the metal complex 126 gradually passes through the heating vessel 116 and hence, it is possible to heat the metal complex 126 for a required time. The crucible 128 which has passed through the predetermined region of the quartz glass tube 132 is gradually cooled, and is cooled to a temperature close to a room temperature when the crucible 128 arrives at an exit of the quartz glass tube 132. According to the method for manufacturing carbon nanotubes of the embodiment 2, by preparing a plurality of crucibles 128 and by sequentially placing these crucibles 128 on the conveyer, it is possible to manufacture carbon nanotubes with high productivity.

Example

1. Manufacturing Apparatus for Manufacturing Carbon Nanotubes

A microwave oven for household use (ES-HA196 made by ZOJIRUSHI CORPORATION) is remodeled and is used as the manufacturing apparatus 10 (see FIG. 1). That is, the remodeling of the microwave oven is performed such that the thermocouple 22 is mounted on the microwave oven so as to adjust a temperature inside the heating vessel 16, and an operation unit (corresponding to the control unit 24) of the microwave oven is remodeled to adjust an output of electromagnetic energy based on temperature information obtained from the thermocouple 22. As the heating vessel 16, a kiln (generic name: microwave kiln; product name: Art Box) which elevates a temperature of the inside thereof due to microwaves of the microwave oven is used.

2. Manufacture of Carbon Nanotubes

Example 1

1.00 g of nickel stearate (made by Mitsuwa Chemicals Co., Ltd.) is put into the alumina-made crucible 28 as the material 26, and the periphery of the crucible 28 is covered with clay 40. The crucible 28 covered with clay 40 is put into a dryer, and clay 40 is dried at a temperature of 120° C. for 5 minutes. Thereafter, the crucible 28 is placed in the kiln installed in the microwave oven. A gas in the kiln is replaced with a nitrogen gas for 10 minutes. Then, in a state where the inside of the kiln is under nitrogen gas atmosphere, microwave energy (output: 600 W) is applied to the kiln for 5 minutes thus elevating a temperature in the kiln to 850° C. Subsequently, microwave energy is continuously applied to the kiln thus maintaining the temperature in the kiln at 850° C. for 5 minutes and, thereafter, the application of microwave energy is stopped. When 5 minutes elapse after stopping the application of microwave energy, the temperature in the kiln is lowered to a room temperature.

The crucible 28 is taken out from the inside of the microwave oven, and coarse carbon nanotubes adhered to the inner wall surface of the lower member 28a of the crucible 28 are collected. In this manner, according to the method for manufacturing carbon nanotubes of this example, all steps from starting of heating of the material to collecting of coarse carbon nanotubes can be carried out in a short time of approximately 15 minutes. A yield of carbon nanotubes at a stage of coarse nanotubes is 17.8%. This yield is calculated by "(mass of coarse carbon nanotubes)/(mass of nickel stearate of material)×100%". Next, to remove nickel particles contained in coarse carbon nanotubes, coarse carbon nanotubes are put into test tubes, and 8 ml of a concentrated hydrochloric acid is added to coarse carbon nanotubes. This test tube is immersed into water in a water bath of an ultrasonic cleaner (UT-105S made by Sharp Corporation) and ultrasonic cleaning is applied to the test tube for one hour. After leaving the test tube on a test tube stand overnight, black powder is precipitated on a bottom of the test tube.

A supernatant liquid in a test tube is removed by a pipette and, thereafter, the addition of 8 ml of water and the removal of a supernatant liquid by the pipette are repeated several times until cleaning water has no color. Next, black powder is dried under reduced pressure thus obtaining refined carbon nanotubes. A yield ((mass of carbon nanotubes)/(mass of nickel stearate of material)×100) was 1.02%.

Example 2

Carbon nanotubes are manufactured using nickel benzoate n hydrate (made by Mitsuwa Chemicals Co., Ltd.) in place of nickel stearate used in the example 1. Carbon nanotubes are manufactured in the same manner as the example 1 except for a point that these examples use different materials. A yield of carbon nanotubes was 10.8% at a stage of a coarse product and was 0.85% at a stage of a refined product.

Comparison Example

Carbon nanotubes are manufactured using copper stearate as a material in place of nickel stearate used in the example 1. Carbon nanotubes are manufactured in the same manner as the example 1 except for a point that the comparison example and the example 1 use different materials. This comparison example obtains a reddish-brown product different from the example 1 and the example 2. When the product is cleaned with a hydrofluoric acid, the product is totally dissolved. It is estimated that the reddish-brown product is not coarse carbon nanotubes but reduced copper. It is considered from this result that, to manufacture carbon nanotubes, it is necessary to use a metal complex containing metal which exhibits an excellent catalytic function in forming carbon nanotubes such as iron, cobalt or nickel as a material.

Other Examples

Carbon nanotubes are manufactured by setting the temperature in the kiln at the time of forming carbon nanotubes at five temperature conditions of 500° C., 600° C., 700° C., 800° C. and 900° C. in place of 850° C. used in the example 1 and the example 2. As a result, when nickel stearate is used as a material, although carbon nanotubes are formed at four temperature conditions of 600° C., 700° C., 800° C. and 900° C., carbon nanotubes are not formed at the temperature condition of 500° C. Further, when nickel benzoate is used as a material, although carbon nanotubes are formed at three temperature conditions of 700° C., 800° C. and 900° C., carbon nanotubes are not formed at the temperature conditions of 500° C. and 600° C.

Carbon nanotubes are manufactured by setting a holding time of the temperature in the kiln at the time of forming carbon nanotubes at three conditions of 10 minutes, 15 minutes and 20 minutes in place of 5 minutes in the example 1. As a result, only a small quantity of carbon nanotubes is formed when the holding time of the reaction temperature in the kiln is 20 minutes. It is considered that the gas tightness of the crucible is not high so that when the reaction time is excessively prolonged, air enters the crucible so that the carbon source present in the crucible reacts with air and a gas generated by such a reaction is removed from a reaction system as a carbon dioxide gas.

3. Analysis of Carbon Nanotubes
(TEM Image)

Figure 3:
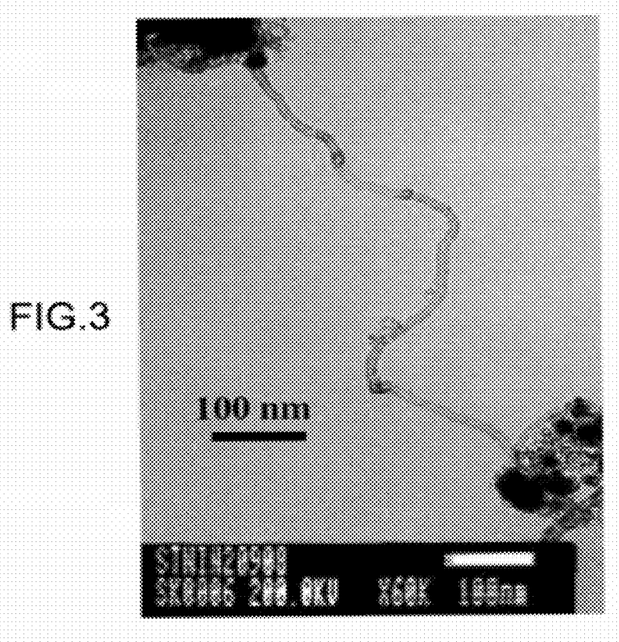
FIG. 3 is a TEM image of carbon nanotubes manufactured in an example 1.
Figure 4:
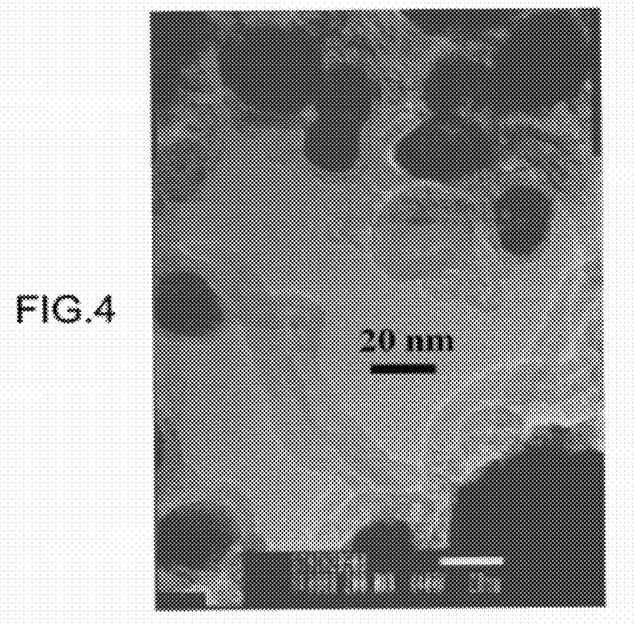
FIG. 4 is a TEM image of carbon nanocapsules manufactured in the example 1.
Figure 5:
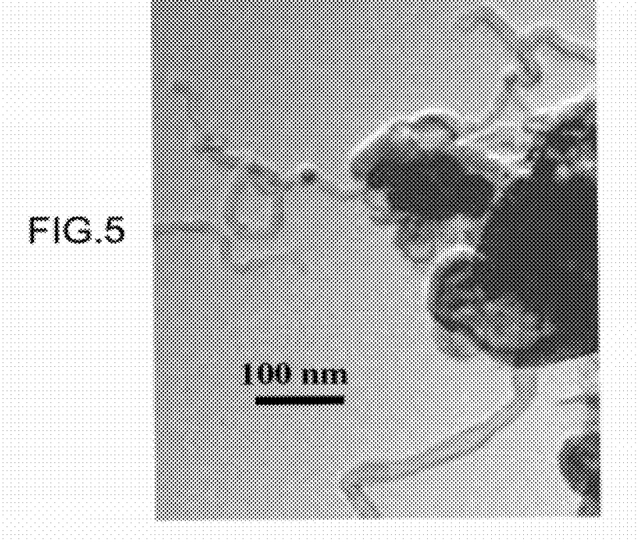
FIG. 5 is a TEM image of carbon nanotubes manufactured in an example 2.
Figure 6:
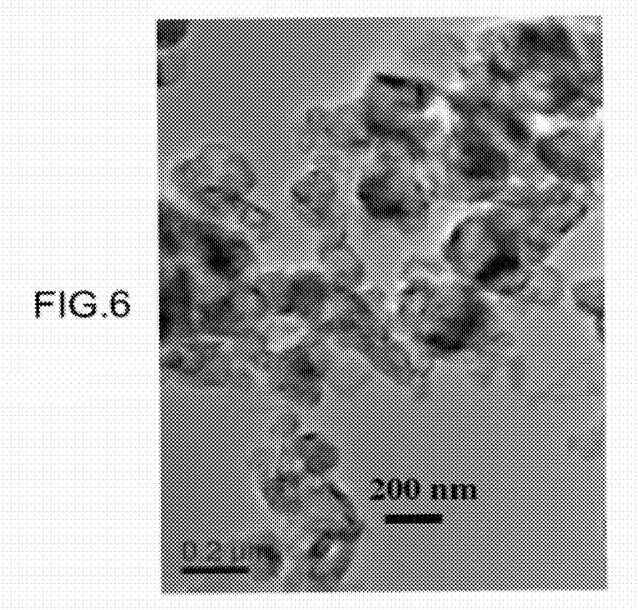
FIG. 6 is a TEM image of carbon nanocapsules manufactured in the example 2.

FIG. 3 shows TEM images of carbon nanotubes manufactured in the example 1, and FIG. 4 shows TEM images of carbon nanocapsules manufactured in the example 1. On the other hand, FIG. 5 shows TEM images of carbon nanotubes manufactured in the example 2, and FIG. 6 shows TEM images of carbon nanocapsules manufactured in the example 2. From these TEM images, it is found that carbon nanotubes and carbon nanocapsules are manufactured in these examples 1 and 2. Further, with respect to carbon nanotubes manufactured in the examples 1 and 2, almost all carbon nanotubes contain nickel particles therein. With respect to carbon nanocapsules manufactured in these examples 1 and 2, a large number of carbon nanocapsules contain nickel particles therein.

Diameters of carbon nanotubes observed in the TEM images shown in FIG. 3 and FIG. 5 fall within a range from 10 to 30 nm. It is considered that the manufactured carbon nanotubes are multi wall carbon nanotubes (MWCNT) judging from these diameters. Further, diameters of carbon nanocapsules observed in the TEM images shown in FIG. 4 and FIG. 6 fall within a range from 30 to 250 nm.

(Raman Spectrum)

Figure 7:
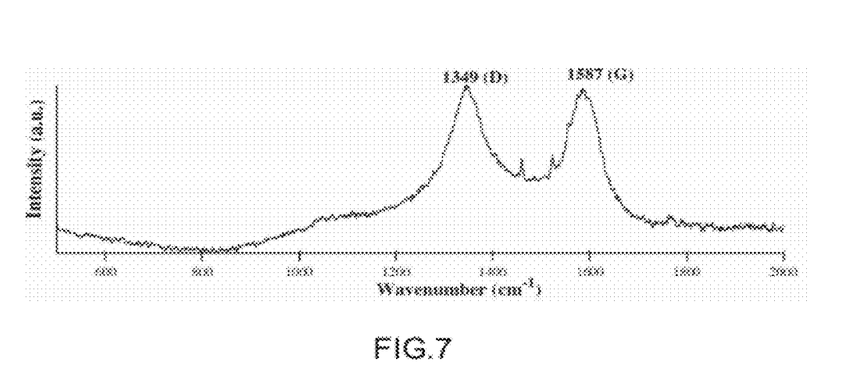
FIG. 7 is a view showing a Raman spectrum of carbon nanotubes manufactured in the example 1.
Figure 8:
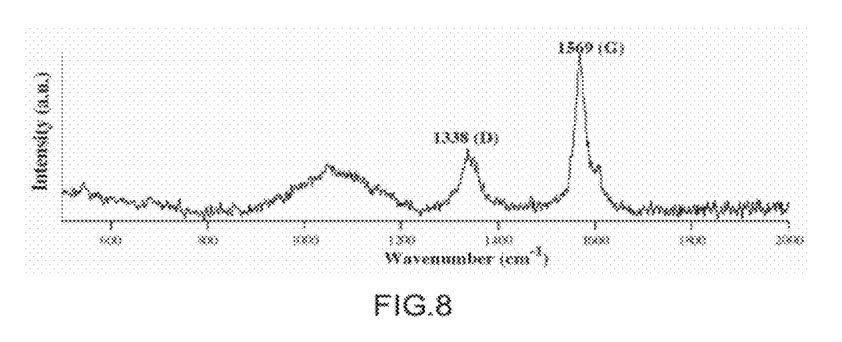
FIG. 8 is a view showing a Raman spectrum of carbon nanotubes manufactured in the example 2.

FIG. 7 shows a Raman spectrum of carbon nanotubes manufactured in the example 1, and FIG. 8 is a view showing a Raman spectrum of carbon nanotubes manufactured in the example 2.

As shown in FIG. 7, carbon nanotubes manufactured in the example 1 have a peak of a G band attributed to the graphite structure at 1587 $cm^{-1}$ and a peak of a D band attributed to a defect of the graphite structure and the amorphous structure at 1349 $cm^{-1}$. A peak intensity ratio between the G band and the D band, that is, "peak intensity of G band/peak intensity of D band" is 0.99. On the other hand, as shown in FIG. 8, carbon nanotubes manufactured in the example 2 have a peak of a G band at 1569 $cm^{-1}$, and a peak of D band at 1338 $cm^{-1}$, and a peak intensity ratio between the G band and the D band is 1.6.

Although an evaluation method of purity of carbon nanotubes based on a peak intensity ratio between a G band and a D band is simple, this evaluation method is reliable. Accordingly, purity of carbon nanotubes manufactured in the example 2, that is, purity of carbon nanotubes manufactured from nickel benzoate is 1.6 times as high as purity of carbon nanotubes manufactured in the example 1, that is, purity of carbon nanotubes manufactured from nickel stearate. In this manner, from a viewpoint of purity of formed carbon nanotubes, it is preferable to manufacture carbon nanotubes using nickel benzoate as the material.

(Magnetism)

Carbon nanotubes manufactured in the example 1 and the example 2 are attracted by a magnet. This phenomenon implies that nickel contained in carbon nanotubes are not removed even by the hydrochloric treatment. That is, it is considered that carbon nanotubes manufactured in the example 1 and the example 2 are chemically stable in a state that nickel particles are contained in the carbon nanotubes. Accordingly, the method for manufacturing carbon nanotubes of the present invention can acquire an advantageous effect that carbon nanotubes having magnetism can be selectively manufactured. Carbon nanotubes having magnetism can be broadly used as toner for a copying machine, a magnetic recording/storing material, a magnetic paint or the like.

(Formation Mechanism)

Figure 9:
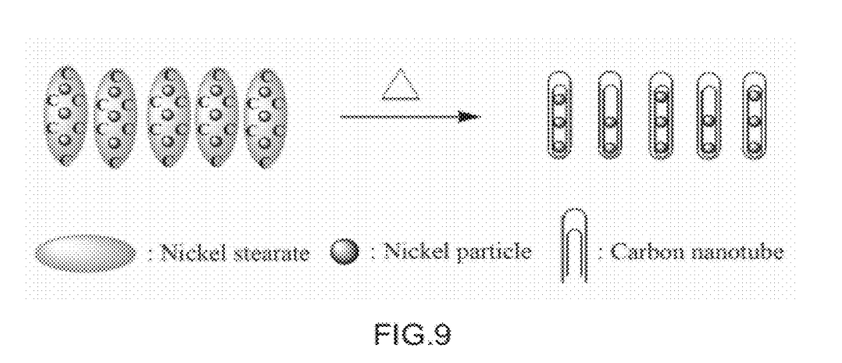
FIG. 9 is a conceptual view showing a formation mechanism of carbon nanotubes in the example 1.

FIG. 9 shows what is considered to be a mechanism for forming carbon nanotubes in the example 1. That is, when nickel stearate is heated, carbon which is contained in a stearic acid is precipitated around nickel particles arranged in series at the center of nickel stearate thus forming carbon nanotubes containing nickel particles.

The invention claimed is:

1. A method for manufacturing carbon nanotubes comprising the steps of:
preparing a metal complex which contains at least one metal selected from a group consisting of iron, cobalt and nickel and an organic compound; and
forming carbon nanotubes which contain metal therein by using the organic compound as a carbon source, wherein the carbon nanotubes are formed by putting the metal complex into a heating vessel which has a substance capable of converting electromagnetic energy into heat, and by heating the metal complex using heat which is generated by the heating vessel when electromagnetic energy is applied to the heating vessel;
wherein the method further comprises a step of placing the metal complex in the heating vessel between the step of preparing metal complex and the step of forming carbon nanotubes;
wherein in the step of placing the metal complex in the heating vessel, the metal complex is placed in the heating vessel by putting the metal complex into a reaction vessel and then placing the reaction vessel in the heating vessel; and
wherein the reaction vessel is a crucible and, in the step of placing the metal complex in the heating vessel, the reaction vessel into which the metal complex is put and which has a periphery thereof coated with clay is placed in the heating vessel.

2. A method for manufacturing carbon nanotubes according to claim 1, wherein the metal complex is a nickel complex of an organic compound having a carbonyl group and wherein the nickel complex of the organic compound having a carbonyl group is nickel benzoate.

3. A method for manufacturing carbon nanotubes according to claim 1, wherein the metal complex is discotic metal complex liquid crystal.

4. A method for manufacturing carbon nanotubes claim 1, wherein the step of forming carbon nanotubes includes a step of maintaining the inside of the heating vessel at a temperature of 600° C. to 900° C. for 5 to 20 minutes.

5. A method for manufacturing carbon nanotubes comprising the steps of:
preparing a metal complex which contains at least one metal selected from a group consisting of iron, cobalt and nickel and an organic compound; and
forming carbon nanotubes which contain metal therein by using the organic compound as a carbon source, wherein the carbon nanotubes are formed by putting the metal complex into a heating vessel which has a substance capable of converting electromagnetic energy into heat, and by heating the metal complex using heat which is generated by the heating vessel when electromagnetic energy is applied to the heating vessel;

wherein in the step of forming carbon nanotubes, while the heating vessel generates heat by applying the electromagnetic energy to the heating vessel, the metal complex gradually passes through the heating vessel so that the metal complex is heated;

wherein in the step of forming carbon nanotubes, a heat-resistant tube is arranged such that a predetermined longitudinal portion of the heat-resistant tube is positioned in the heating vessel and the reaction vessel which contains the metal complex is gradually moved in the heat-resistant tube in a longitudinal direction so that the metal complex gradually passes through the heating vessel; and wherein the reaction vessel is a crucible and, in the step of forming carbon nanotubes, the reaction vessel into which the metal complex is put and which has a periphery thereof coated with clay is gradually moved in the heat-resistant tube in the longitudinal direction.

6. A method for manufacturing carbon nanotubes according to claim 5, wherein in the step of forming carbon nanotubes, the inside of the heating vessel is heated at a temperature of 600° C. to 900° C., and the metal complex gradually passes thorough the heating vessel for 5 to 20 minutes.

7. A method for manufacturing carbon nanotubes comprising the steps of:

preparing a metal complex which contains at least one metal selected from a group consisting of iron, cobalt and nickel and an organic compound; and forming carbon nanotubes which contain metal therein by using the organic compound as a carbon source, wherein the carbon nanotubes are formed by putting the metal complex into a heating vessel which has a substance capable of converting electromagnetic energy into heat, and by heating the metal complex using heat which is generated by the heating vessel when electromagnetic energy is applied to the heating vessel; and wherein the substance capable of converting electromagnetic energy into heat is at least one selected from a group of substances consisting of alumina, mullite, ferrite, silicon nitride and silicon carbide.

8. A method for manufacturing carbon nanotubes comprising the steps of:

preparing a metal complex which contains at least one metal selected from a group consisting of iron, cobalt and nickel and an organic compound; and forming carbon nanotubes which contain metal therein by using the organic compound as a carbon source, wherein the carbon nanotubes are formed by putting the metal complex into a heating vessel which has a substance capable of converting electromagnetic energy into heat, and by heating the metal complex using heat which is generated by the heating vessel when electromagnetic energy is applied to the heating vessel; and wherein the step of forming carbon nanotubes is carried out in an inert-gas atmosphere.

* * * * *